United States Patent [19]

Iwahashi

[11] Patent Number: 4,903,915
[45] Date of Patent: Feb. 27, 1990

[54] TAPE CASSETTE HAVING MEANS FOR LOCKING REELS THEREOF

[75] Inventor: Yuji Iwahashi, Miyagi, Japan

[73] Assignee: Sony Corporation, Tokyo, Japan

[21] Appl. No.: 306,667

[22] Filed: Feb. 6, 1989

[30] Foreign Application Priority Data

Mar. 31, 1988 [JP] Japan .................................. 63-80131

[51] Int. Cl.⁴ ........................ G03B 11/04; G11B 15/32
[52] U.S. Cl. ..................................... 242/198; 360/132
[58] Field of Search ............................ 242/197–199; 360/132

[56] References Cited

U.S. PATENT DOCUMENTS

| 4,022,401 | 5/1977 | Kishi | 242/198 |
| 4,513,929 | 4/1985 | Oishi et al. | 360/132 X |
| 4,553,717 | 11/1985 | Takagi | 242/199 X |
| 4,579,295 | 4/1986 | Harada | 242/198 |
| 4,585,187 | 3/1986 | Okamura et al. | 242/198 |
| 4,604,671 | 8/1986 | Oishi | 360/132 |
| 4,631,619 | 12/1986 | Hashizume et al. | 242/198 X |
| 4,679,110 | 7/1987 | Schoettle et al. | 360/132 |

FOREIGN PATENT DOCUMENTS

| 0111876 | 6/1984 | European Pat. Off. |
| 0146311 | 6/1985 | European Pat. Off. |
| 0153137 | 8/1985 | European Pat. Off. |
| 0163293 | 12/1985 | European Pat. Off. |
| 0179169 | 4/1986 | European Pat. Off. |
| 62-78747 | 6/1986 | Japan |
| 61-210582 | 9/1986 | Japan |
| 2044733 | 10/1980 | United Kingdom |
| 2114952 | 9/1983 | United Kingdom |
| 2131769 | 6/1984 | United Kingdom |

Primary Examiner—Thomas R. Hannon
Attorney, Agent, or Firm—Ronald P. Kananen

[57] ABSTRACT

A tape reel lock and release device having gear portions formed around outer peripheries of a pair of tape reels rotatably provided within a cassette half, a tape reel locking member having a slider portion which is slidably spring-biased by a spring between the pair of tape reels within the cassette half in the direction in which it is engaged with the gear portions of the pair of tape reels and a pair of engaging members coupled to a top end of the slider portion to be engaged with the gear portions of the tape reels, the pair of engaging members being curved at their tip ends toward the gear portions and having hinge portions formed at their base end portions so as to be displaced in the direction in which the pair of engaging members approach each other and an extending operation member protrusively formed on the cassette half so as to be located between the engaging members and entering, when the tape reel locking member is slidably moved toward the reel locking direction, between the engaging members to extend the engaging members toward the gear portions of the tape reels. Thus, when the engaging members are engaged with the gear portions of the tape reels, the slackening of a magnetic tape wound around the tape reels can be absorbed and the tape reels can be prevented from being rotated inadvertently.

8 Claims, 6 Drawing Sheets

TAPE CASSETTE HAVING MEANS FOR LOCKING REELS THEREOF

BACKGROUND OF THE INVENTION

1. Field of the Invention

The present invention relates generally to a tape cassette having means for locking reels thereof and, more particularly, is directed to a tape reel lock and release device of a tape cassette which can, upon non-use of tape cassette, prevent tape reels from being rotated unintentionally by engaging members formed on a reel locking member with gear portions of the tape reels.

2. Description of the Prior Art

In a tape cassette, when tape reels rotatably provided within cassette halves are rotated upon non-use, a magnetic tape wound around the tape reels is slackened. The assignee of the present application has previously proposed a tape reel lock and release device which can prevent tape reels from being rotated inadvertently. This previously-proposed tape reel lock and release device is disclosed, for example, in Japanese Patent Application No. 62-78747.

Figure 1:
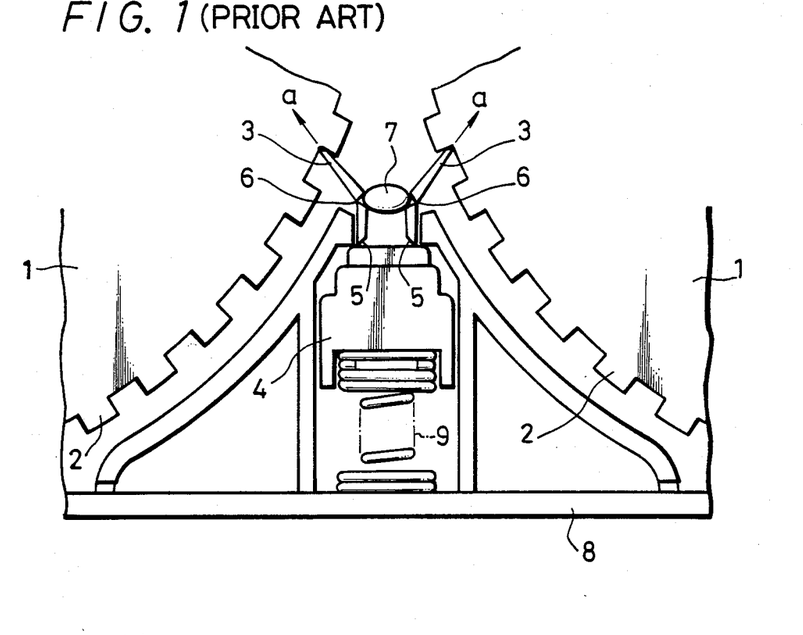
FIG. 1 is an enlarged, plan view illustrating a main portion of a prior art tape reel lock and release device.

An enlarged, plan view forming FIG. 1 illustrates an example of such tape reel lock and release device. As Fig. 1 shows, a reel locking member 4 having a pair of engaging members 3, 3 to be engaged with gear portions 2 of a tape reel 1 is spring-biased toward the tape reels 1 by a spring 9. Hinge portions 5 and 6 are each formed on the base portions and intermediate portions of the pair of engaging members 3 and 3. Further, a central rib 7 is protrusively formed from a cassette half 8 at the position in which the engaging members 3 are engaged with the gear portions 2. This central rib 7 extends the engaging members 3, 3 toward the tape reels 1, causing the tape reels 1 and the engaging members 3 to be engaged with each other.

In this prior art tape reel lock and release device, however, the gear portions 2 and the engaging members 3 can be engaged positively to some extent. In this engagement, the engaging members 3, 3 push the tape reels 1 in the direction shown by arrows a in FIG. 1 such that the tape reels 1 are moved toward the tape eject opening side. There is then a risk that the magnetic tape (not shown) wound around the tape reels 1 will be slackened. If the magnetic tape is slackened as described above, when the tape cassette, for example, is ejected from a cassette loading portion of a video camera or the like, its lid portion will bite the magnetic tape.

Figure 2:
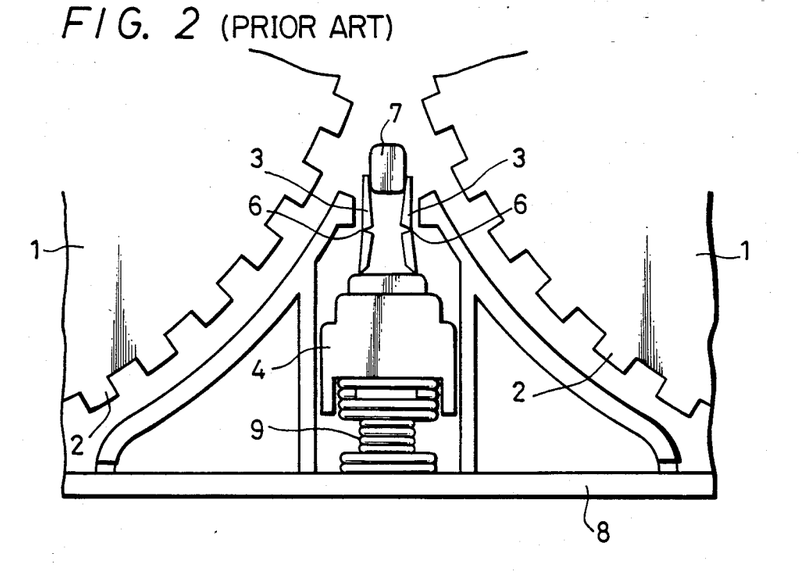
Figure 3:
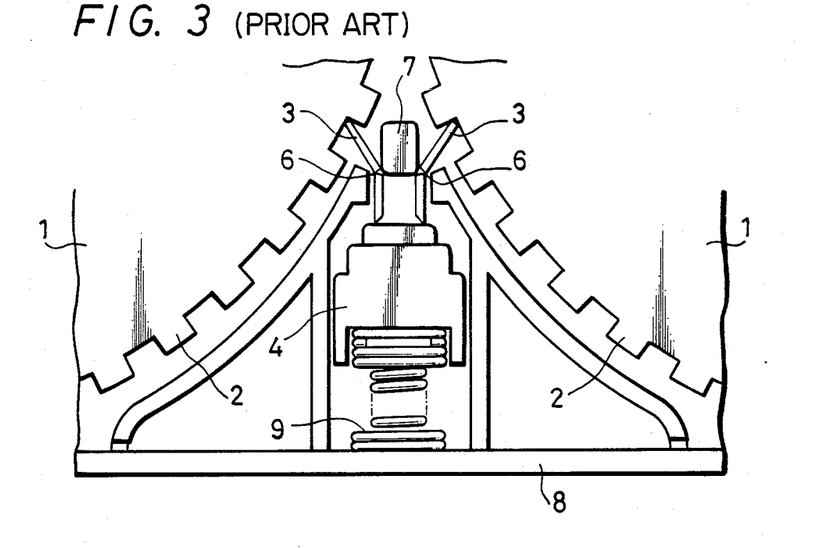
Figure 4:
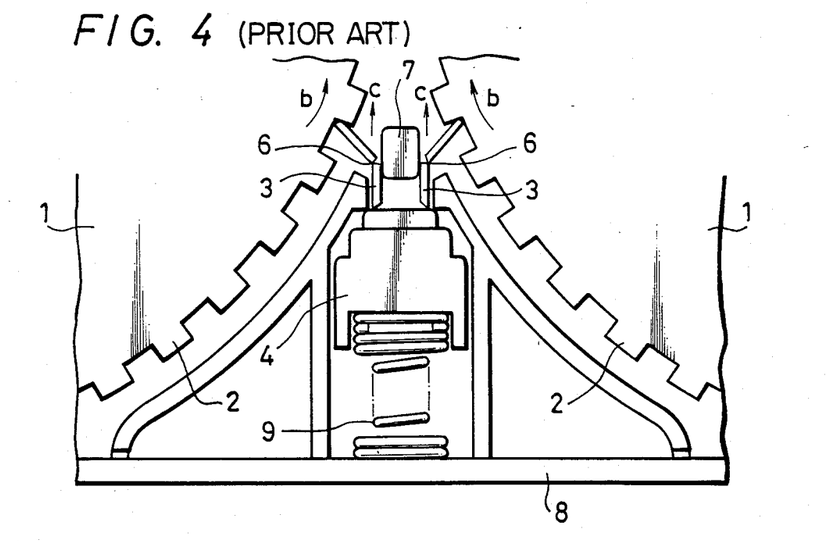

Therefore, as shown in FIGS. 2 to 4, the configuration of the central rib 7 which extends the engaging members 3, 3 is modified, whereby while the reel locking member 4 is moved from its lock-released state shown in FIG. 2 to its locking completion state shown in FIG. 4, the engaging members 3, 3 come in contact with the central rib 7 as shown in FIG. 3, thus the engaging members 3, 3 being extended to be engaged with the gear portions 2. Thereafter, the reel locking member 4 is slid further such that the engaging members 3, 3 rotate the tape reels 1 in the tape slack absorbing direction shown by arrows b in FIG. 4. Thus, upon locking, the tape slack can be absorbed.

When the reel locking member 4 is slid relative to the central rib 7 as described above, the pair of engaging members 3 and 3 formed at the top of the reel locking member 4 are provided with hinge portions 6 and 6 at their intermediate portions so that the engaging members 3 and 3 can be displaced at their hinge portions 6 and 6. Thus, when the engaging members 3 rotate the tape reels 1 in the tape slack absorbing directions b, the engaging members 3 are flexed at their hinge portions 6 formed at the intermediate positions thereof, thus the tape reels 1 cannot be rotated sufficiently in the tape slack absorbing direction b.

Figure 5:
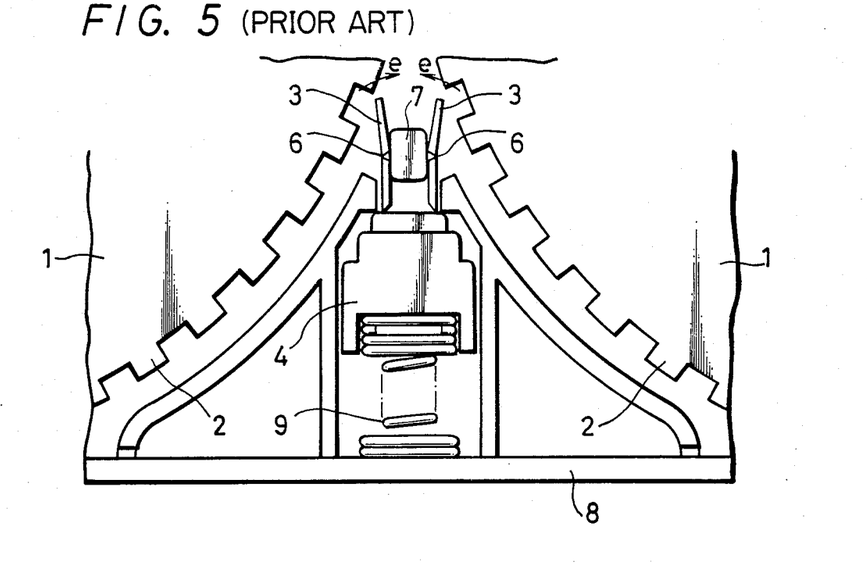

Further, when the engaging members 3 rotate the tape reels 1 in the tape slack absorbing direction b, the engaging members 3 push the tape reels 1 in the direction shown by arrows c in FIG. 4 with the result that their pushing forces weaken, swinging the engaging members 3 in the direction shown by arrows e in FIG. 5. There is then a risk that the engaging members 3 will come off from the gear portions 2 of the tape reels 1. Consequently, the tape reels 1 cannot be sufficiently prevented from being inadvertently rotated by the above-mentioned locking member 4.

Furthermore, since the hinge portions 6 are formed on the intermediate portions of the engaging members 3, when the engaging members 3 are handled as assembly parts and/or attached to the tape cassette or the engaging members 3 are left for a long period of time under the reel lock releasing condition after they are incorporated in the tape cassette, the engaging members 3 are frequently deformed so that the tape reels 1 cannot be positively prevented from being rotated.

OBJECTS AND SUMMARY OF THE INVENTION

Accordingly, it is an object of the present invention to provide an improved tape reel lock and release device which can remove the defects encountered with the prior art.

It is another object of the present invention to provide a tape reel lock and release device in which tape reels can be locked positively without slackening a magnetic tape.

It is a further object of the present invention to provide a tape reel lock and release device which can positively prevent tape reels from being rotated unintentionally.

It is a yet further object of the present invention to provide a tape reel lock and release device for use with a tape cassette of an 8 mm video camera.

According to one aspect of the present invention, there is provided a tape reel lock and release device comprising:

(a) gear portions formed around outer peripheries of a pair of tape reels rotatably provided within a cassette half of a cassette housing;

(b) a tape reel locking member having a slider portion which is slidably spring-biased by spring-biasing means between said pair of tape reels within said cassette half in the direction in which it is engaged with said gear portions of said pair of tape reels and a pair of engaging members coupled to a top end of said slider portion to be engaged with said gear portions of said tape reels, said pair of engaging members being curved at their tip ends toward said gear portions and having hinge portions formed at their base end portions so as to be displaced in the direction in which said pair of engaging members approach each other; and (c) an extending operation member protrusively formed on said cassette half so as to be located between said engaging members of said tape reel locking member and entering, when said tape reel locking member is slidably moved toward the reel locking direction, between said engaging members to extend said engaging members toward said gear portions of said tape reels, wherein said engaging members are engaged with said gear portions of said tape reels thereby preventing said tape reels from being rotated inadvertently.

The above, and other objects, features and advantages of the present invention will become apparent from the following detailed description of the preferred embodiments to be taken in conjunction with the accompanying drawings, in which like reference numerals identify like elements and parts.

BRIEF DESCRIPTION OF THE DRAWINGS

FIGS. 2 to 5 are enlarged, plan views of a main portion of an example of a modified prior art tape reel lock and release device, respectively, wherein;

FIG. 2 illustrates the lock released condition;

FIG. 3 illustrates the condition that the locking operation is now being done;

FIG. 4 illustrates the condition that the locking operation is just finished; and FIG. 5 illustrates the condition that the engaging member is disengaged from a gear portion of a tape reel;

FIGS. 7 to 9 are enlarged, plan views of a main portion of an embodiment of a tape reel lock and release device according to the present invention, respectively, wherein;

FIG. 7 illustrates the lock released condition;

FIG. 8 illustrates the condition that the locking operation is now being done;

FIG. 9 illustrates the condition that the locking operation is just finished;

DETAILED DESCRIPTION OF THE PREFERRED EMBODIMENTS

The present invention will now be described with reference to the attached drawings.

Figure 6:
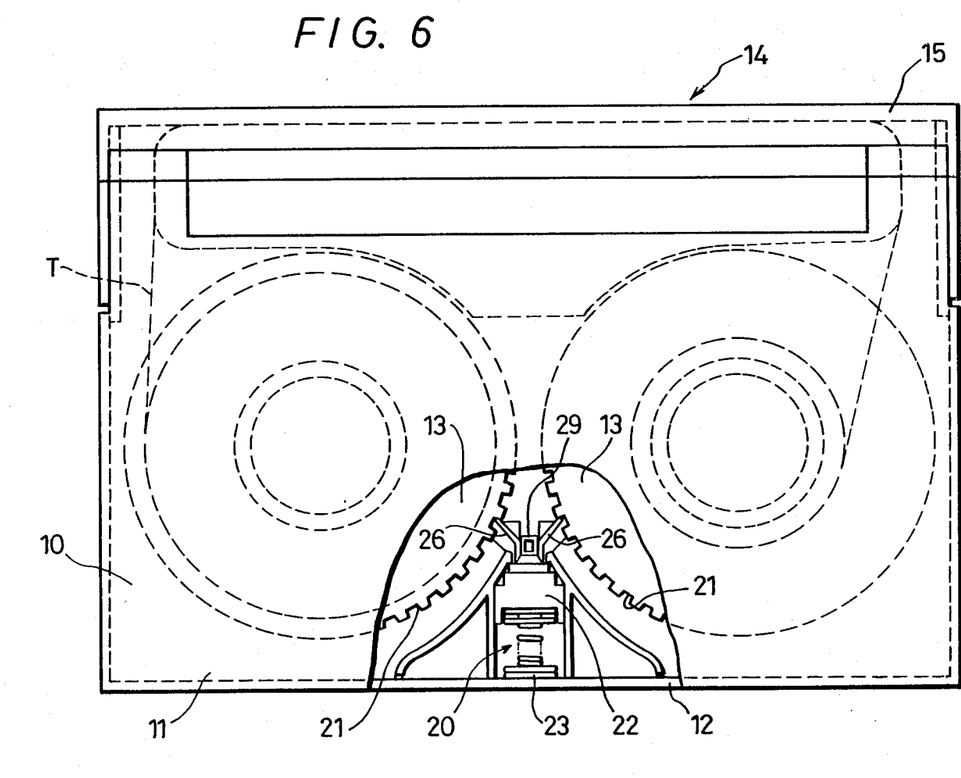
FIG. 6 is a partly cut-away plan view of a tape cassette to which the present invention is applied.

A partly cut-away plan view forming FIG. 6 illustrates a tape cassette for use in a so-called 8 mm video camera to which an embodiment of a tape reel lock and release device according to the present invention is applied.

As FIG. 6 shows, in this tape cassette, an upper half 11 and a lower half 12 each made of a synthetic resin are combined together to form a cassette housing 10 by some suitable means such as screws (not shown) and the like. A pair of tape reels 13 around which a magnetic tape T is wound are rotatably provided within the cassette housing 10.

The magnetic tape T wound around the tape reels 13 is extended along a front opening portion 14 of the cassette housing 10 and pinched by lid members (not shown) at the inside of a front lid 15. Thus, when this tape cassette is loaded on a cassette loading portion of a video camera or the like though not shown, the front lid 15 and the lid members are moved upward to withdraw the magnetic tape T.

This cassette housing 10 incorporates therein a tape reel lock and release device 20 of which the main portion is illustrated in FIGS. 6 to 10. The arrangement of this tape reel lock and release device 20 will be described with reference to FIGS. 6 to 10.

Referring to the figures, gear portions 21 are formed on the outer peripheries of the pair of tape reels 13 that are rotatably provided within the upper and lower halves 11 and 12 of the cassette housing 10.

A reel locking member 22 is located between the pair of tape reels 13 so as to be engaged with the gear portions 21.

Figure 7:
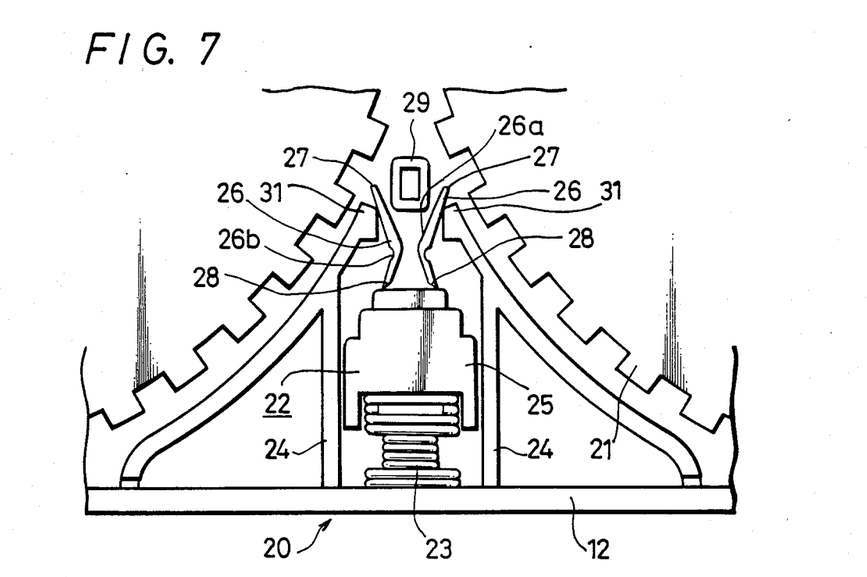

As shown, for example, in FIG. 7, the above-mentioned reel locking member 22 is spring-biased by a spring 23 in the direction in which it is engaged with the gear portions 21 of the tape reels 13 and, this reel locking member 22 is supported between guide walls 24 so as to become freely slidable.

Specifically, the reel locking member 22 is comprised of a slider portion 25 slidably provided between the guide walls 24 and a pair of engaging members 26, 26 that are mounted on the top of the slider portion 25 so as to be engaged with the gear portions 21 of the tape reels 13, respectively. The engaging members 26 and 26 are curved in substantially C-letter configuration at their intermediate curved portions 26a so that their top portions form engaging nails 27, respectively. Hinge portions 28 are respectively formed at the base portions of the engaging members 26 and 26 so as to be displaced in the direction in which they approach each other. The engaging members 26 are coupled to the slider portion 25 via these hinge portions 28. The curved portions 26a of the engaging members 26 are formed slightly thick in order to come in contact with an extending operation member 29 which will be described later. It is also possible that slightly thin portions 26b may be formed on the outside of the curved portions 26a to allow the engaging members 26 to function as limiters.

Near the top portions of the guide walls 24 which slidably support the tape reel locking member 22, the extending operation member 29 is protrusively formed from the lower half 12 so as to oppose the engaging nails 27, 27 of the tape reel locking member 22. This extending operation member 29 advances, when the tape reel locking member 22 is slidably moved in the reel locking direction, between the engaging members 26 and 26 to extend the engaging members 26 and 26 toward the gear portions 21 of the tape reels 13, whereby the engaging nails 27 are engaged with the gear portions 21, thus the tape reels 13 being prevented from being rotated.

Figure 10:
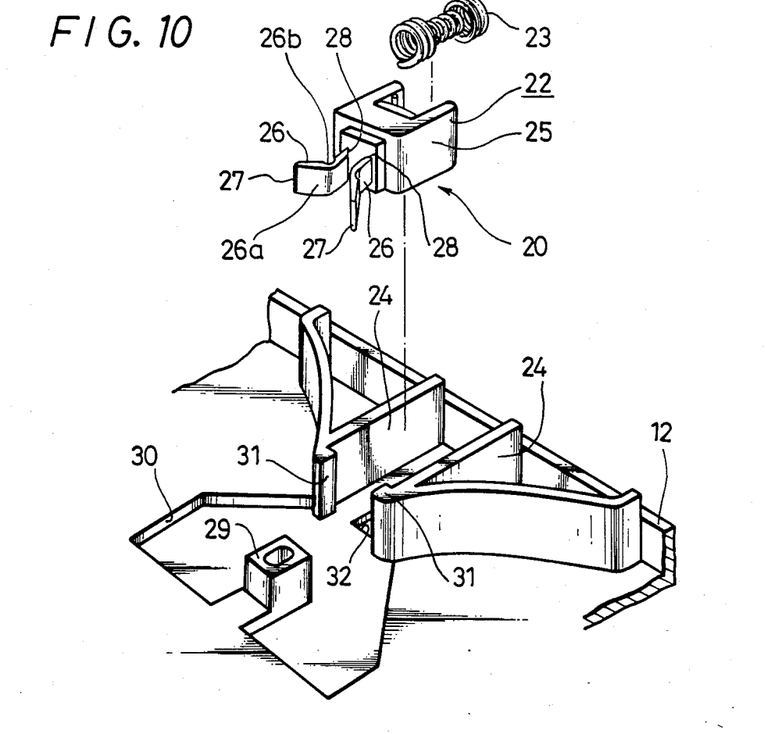
FIG. 10 is an exploded, perspective view of a main portion of the tape reel lock and release device according to the present invention.

As shown in FIG. 10, a step portion 30 is formed on the lower half 12 at the sliding position of the tape reel locking member 22, whereby the engaging nails 27 of the tape reel locking member 22 can be positively engaged with the gear portions 21 of the tape reels 13.

The thus constructed tape reel locking member 22 can prevent, upon non-use of the tape cassette, the tape reels 13 from being rotated inadvertently as follows.

Upon use of the tape cassette, as shown in FIG. 7, a lock release pin (not shown) provided on the cassette loading mechanism of, for example, a video camera enters this cassette housing 10 through an entrance 32 (see FIG. 10) to bias the tape reel locking member 22 against the spring force of the spring 23, allowing the tape reels 13 to rotate. At that time, the engaging members 26 of the tape reel locking member 22 are displaced by stoppers 31 formed on the top portions of the guide walls 24 such that they approach each other.

In the unloading operation for unloading the tape cassette from the cassette loading mechanism or the like from this condition, the tape reel locking member 22 thus spring-biased by the lock release pin (not shown) is released.

When the tape reel locking member 22 is released from its biased state by the lock release pin, the tape reel locking member 22 is slidably moved between the guide walls 24 in the locking direction of the tape reels 13 by the spring-biasing force of the spring 23.

Figure 8:
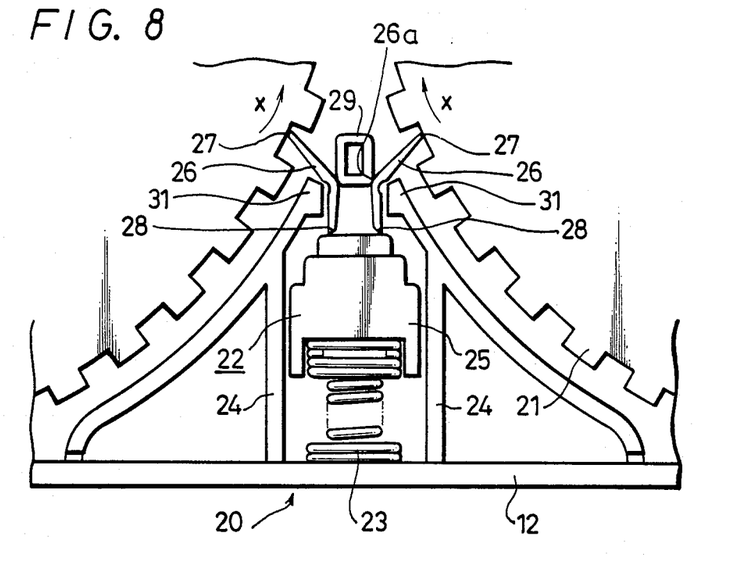

At that time, as shown in FIG. 8, while the tape reel locking member 22 is being slid, the extending operation member 29 comes in contact with the curved portions 26a of the engaging members 26 coupled to the top portion of the tape reel locking member 22 and then advances between the engaging members 26 to extend the engaging members 26, thus causing the engaging nails 27 formed on the top portions of the engaging members 26 to be engaged with the gear portions 21 of the tape reels 13, respectively.

When the tape reel locking member 22 is further slid to the position of the stoppers 31 of the guide walls 24 under the condition that the engaging members 26 are engaged with the gear portions 21 of the tape reels 13, the engagement between the engaging members 26 and the gear portions 21 slightly rotates the tape reels 13 in the direction in which the magnetic tape T is wound. Then, the reel locking operation is completed at the position shown in FIG. 9. The tape reels 13 are rotated in the magnetic tape rewinding direction, thus removing the slackening of the magnetic tape T.

Figure 9:
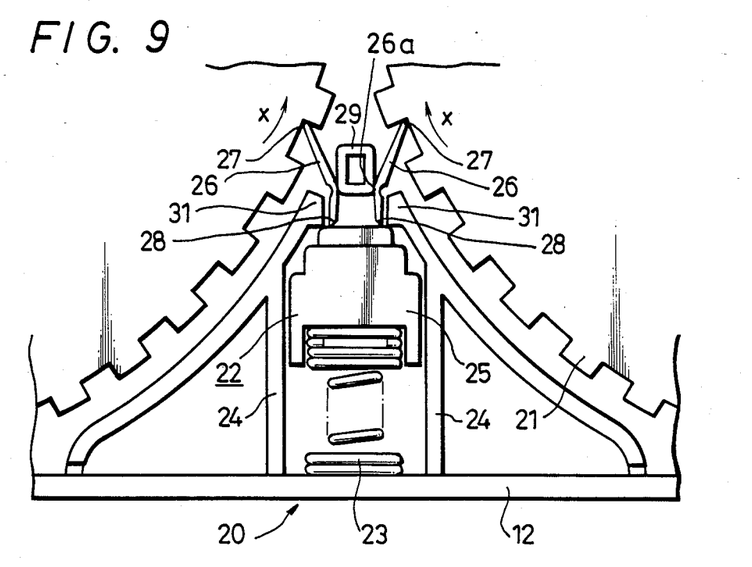

Specifically, according to the present invention, during the process where the tape reel locking member 22 is moved from the lock releasing state shown in FIG. 7 and the locking completion state shown in FIG. 9, the tape reel locking operation is carried out in former and latter steps. That is, in the former step, as shown in FIG. 8, the engaging members 26 come in contact with the extending operation member 29 to extend the engaging members 26, thus allowing the engaging nails 27 to be engaged with the gear portions 21 of the tape reels 13. In the latter step, the engaging members 26 rotate the tape reels 13 in the tape slack absorbing directions x.

According to the above-mentioned tape reel locking member 22, while removing the slackening of the magnetic tape T, the tape reels 13 can be prevented from being rotated unintentionally upon non-use. Since the slackening of the magnetic tape T can be removed in the locking operation of the tape reels 13 as described above, when the tape cassette is unloaded from the cassette loading mechanism of the video camera or the like, the front lid 15 and the lid members (not shown) can be prevented from biting the magnetic tape T. Also, upon loading the tape cassette, a so-called tape jamming and the like can be prevented.

Further, in the tape reel locking operation, the engaging members 26 for avoiding the inadvertent rotation of the tape reels 13 can be prevented from being displaced at their intermediate portions so that the top portions of the engaging members 26 can be prevented from being swung, thus enabling the engaging nails 27 to be positively engaged with the gear portions 21 of the tape reels 13. At the same time, the tape reels 13 can be positively rotated in the tape slackening absorbing directions x shown in FIG. 8. Even after the tape reels 13 are rotated as described above, the above-mentioned engagement between the engaging nails 27 and the gear portions 21 can be maintained positively by a sufficient pushing force.

Furthermore, the above engaging members 26 are not provided with the hinge portions at their intermediate portions so that even when the engaging members 26 are left for a long period of time under the tape reel lock released condition or the like, the engaging members 26 can be prevented from being deformed.

Figure 11:
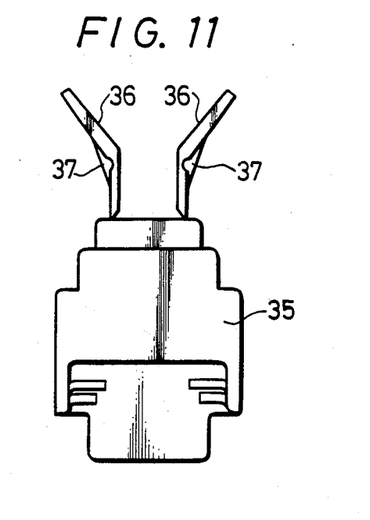
FIGS. 11 and 12 are plan views illustrating examples of modified tape reel locking members used in the present invention, respectively.

While the embodiment of the present invention is described as above, the present invention is not limited to the above embodiment but can take various modifications thereof on the basis of the technical idea of the present invention. As, for example, shown in FIG. 11, ribs 37 are formed on the curved portions of engaging members 36 of a tape reel locking member 35 thereby to reinforce the engaging members 36 such that they can be prevented from being displaced at their curved portions.

Figure 12:
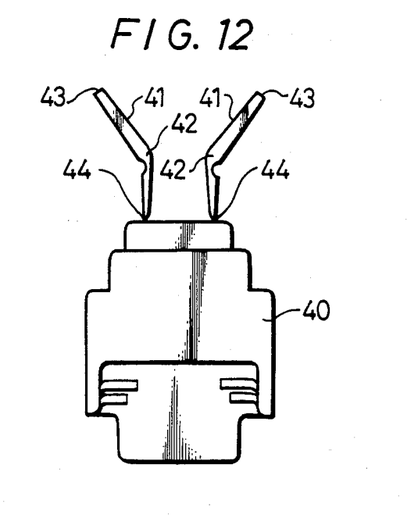

On the other hand, as shown in FIG. 12, engaging members 41 of a reel locking member 40 are formed thick from their curved portions 42 to their engaging nails 43 so as not to be displaced, while the engaging members 41 are formed thin from their curved portions 42 to their hinge portions formed on the base ends thereof so that the engaging members 41 function as a limiter which limits the rotation of the tape reels 13.

According to the present invention, as set forth above, after the tape reels are slightly rotated in the slackening absorbing direction of the magnetic tape by the tape reel locking member, the tape reels can be locked. Therefore, the tape reels can be locked positively without slackening the magnetic tape. Further, when the tape reels are locked by the tape reel locking member, the engaging members to be engaged with the tape reels can be prevented from being displaced at their intermediate portions so that the gear portions of the tape reels and the engaging nails can be engaged with each other by a sufficient pushing force. Accordingly, when the tape reels are rotated in the tape slackening absorbing directions by the engaging nails, the engaging nails can be prevented from being disengaged from the gear portions of the tape reels.

Therefore, according to the present invention, the tape slack can be avoided and the tape reels can be positively prevented from being rotated unintentionally upon non-use.

It should be understood that the above description is presented by way of example on the preferred embodiments of the invention and it will be apparent that many modifications and variations thereof could be effected by one with ordinary skill in the art without departing from the spirit and scope of the novel concepts of the invention so that the scope of the invention should be determined only by the appended claims.

I claim as my invention:

1. A tape reel lock and release device for a pair of tape reels rotatably provided within a cassette half of a cassette housing, wherein a tape is wound around the tape reels, comprising:
    (a) gear portions formed around outer peripheries of the tape reels;
    (b) a tape reel locking member having a slider portion and a pair of engaging members coupled to said slider portion for engagement with said gear portions of the tape reels, said engaging members having base end portions adjacent to said slider portion, tips for engaging said gear portions, curved portions between said base end portions and said tips so that said tips extend toward said gear portions, and hinge portions connecting the base end portions to said slider portion so as to facilitate displacement of said engaging members toward one another;

(c) means for spring-biasing said slider portion between the pair of tape reels in a direction in which said tape reel locking member engages said gear portions of said pair of tape reels; and (d) an operation member extending from the cassette half to between said engaging members and, when said slider portion is moved in the direction in which the tape reel locking member engages the gear portions of the tape reels, said operation member cams said engaging members into engagement with said gear portions, whereby the tape reels are prevented from being rotated inadvertently.

2. A tape reel lock and release device according to claim 1, wherein each of said engaging members has a first portion extending from its curved portion to its tip, and a second portion extending from its curved portion to said hinge portion, said curved portion being thinner than said first portion and said second portion.

3. A tape reel lock and release device according to claim 2, wherein said first portion is thicker than said second portion, whereby said tape reel locking member functions as a limiter to limit the rotation of said tape reels.

4. A tape reel lock and release device according to claim 2, wherein each of said engaging members has a length and a rib extending across said curved portion generally parallel to said length, so as to reinforce said engaging member, such that said engaging members can be prevented from being deflected at said curved portions.

5. A tape reel lock and release device according to claim 1, wherein said cassette half includes guide walls, and said slider portion slides between said guide walls.

6. A tape reel lock and release device according to claim 5, wherein said guide walls have stoppers contacting said engaging members upon movement of said slider member in a direction away from engagement with said gear portions of the tape reels so as to displace said engaging members toward one another upon use of the tape cassette.

7. A tape reel lock and release device according to claim 1, wherein a step portion is formed on said cassette half at the sliding position of the tape reel locking member, whereby the tips of said engaging members can be positively engaged with said gear portions of the tape reels.

8. A tape reel lock and release device according to claim 1, wherein said spring-biasing means biases said slider portion beyond a position in which the engaging members engage the gear portions of said tape reels to a position in which said engaging members have rotated said tape reels in a direction to take up slack in the tape on said tape reels.

* * * * *